US008625681B2

United States Patent
Xu et al.

(10) Patent No.: US 8,625,681 B2
(45) Date of Patent: Jan. 7, 2014

(54) RATE-DISTORTION COST REDUCING VIDEO ENCODING TECHNIQUES

(75) Inventors: Lidong Xu, Beijing (CN); Yi-Jen Chiu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1018 days.

(21) Appl. No.: 12/217,805

(22) Filed: Jul. 9, 2008

(65) Prior Publication Data
US 2010/0008417 A1 Jan. 14, 2010

(51) Int. Cl.
*H04N 1/409* (2006.01)
*H04N 5/217* (2011.01)

(52) U.S. Cl.
USPC .............................. 375/240.29; 375/240.27

(58) Field of Classification Search
USPC ........................................ 375/240.27, 240.29
See application file for complete search history.

(56) References Cited

U.S. PATENT DOCUMENTS

2007/0058716 A1* 3/2007 Blum ........................ 375/240.03
2008/0247467 A1* 10/2008 Rusanovskyy et al. .. 375/240.16
2010/0254448 A1* 10/2010 Xu et al. ................... 375/240.02

FOREIGN PATENT DOCUMENTS

| EP | 1841230 A1 | 10/2007 |
| JP | 2007-251881 A | 9/2007 |
| WO | 2006/108654 A2 | 10/2006 |
| WO | WO 2006108654 A2 * | 10/2006 ............... H04N 7/26 |
| WO | 2007/111292 A1 | 10/2007 |
| WO | 2008075247 A1 | 6/2008 |

OTHER PUBLICATIONS

S. Wittman & T. Wedi, "Transmission of Post-Filter Hints for Video Coding Schemes", 1 IEEE Int'l Conf. on Image Processing 2007 (ICIP 2007) 81-84 (Oct. 2007).*
Office Action Received for Korean Patent Application No. 2009-0062562, mailed on Dec. 13, 2010, 3 pages of English Translation.
Vatis, Y. et al.,"Coding of Coefficients of two-dimensional non-separable Adaptive Wiener Interpolation Filter", submitted to Visual Communications and Image Processing (VCIP) Jul. 2005, 9 Pages.
Chiu, Yi-Jen et al.,"Adaptive (Wiener) Filtering for SVC Bit Depth Scalability", Document JVT-AA023, Apr. 2008, 14 pages.
Wittmann, Steffen et al.,"SEI message on post-filter hints", Document JVT-U035, Oct. 2006.
Chiu, Yi-Jen et al., "Adaptive (Wiener) Filter for Video Compression", ITU-T SC16/Q6, Geneva, Apr. 22-May 2, 2008, 12 pages.

(Continued)

*Primary Examiner* — Dave Czekaj
*Assistant Examiner* — David N Werner
(74) *Attorney, Agent, or Firm* — Trop, Pruner & Hu, P.C.

(57) ABSTRACT

Techniques are described that can be used to determine parameters of an adaptive Wiener filter to apply to a video region. The following parameters of the Wiener filter may be adjusted: coefficients, coefficient quantization, filter type, filter size, prediction mode, entropy encoding, and number of filter tables. The parameters associated with the lowest rate distortion cost of the encoder are selected for transmission with the encoded video. If not using adaptive Wiener filtering results in a lowest rate distortion cost, then adaptive Wiener filtering is not used for the video region. If using adaptive Wiener filtering results in a lowest rate distortion cost, then the parameters applied by the adaptive Wiener filtering that result in the lowest rate distortion cost are communicated with the filtered video region.

27 Claims, 5 Drawing Sheets

(56) References Cited

OTHER PUBLICATIONS

Office Action Received for Chinese Patent Application No. 2200910152137.8, mailed on Jun. 2, 2011, 12 pages of Chinese Office Action including 7 pages of English Translation.
Office Action received for European Patent Application No. 09251758.0, mailed on Nov. 17, 2011, 9 pages.
Wiegand et al., "Rate-Constrained Coder Control and Comparison of Video Coding Standards", IEEE Transactions on Circuits and Systems for Video Technology, vol. 13, No. 7, Jul. 1, 2003, 16 pages.
"Adaptive (Wiener) Filter for Video Compression", ITU-T SG16 Meeting, Apr. 22-May 2, 2008, Geneva, No. T05-SG16-C-0437, Apr. 14 2008, 8 pages.
Office Action Received for Chinese Patent Application No. 200910152137.8, mailed on Nov. 8, 2011, 4 pages Chinese Office Action, 6 pages English Translation.
European Search Report mailed Nov. 10, 2011 in EP 0925178.0, 4 pages.
"Adaptive (Wiener) Filter for Video Compression", ITU-T SG16 Meeting, Jul. 16-18, 2008, Berlin Germany, Q.61 SG16, Jul. 11, 2008, 6 pages.
Office Action Received for Korean Patent Application No. 2009-0062562, mailed on Jul. 22, 2011, 2 pages of English Translation only.
Office Action received for European Application No. 09251758.0, mailed Jan. 17, 2013, 11 pages of Office Action.
Office Action received for European Application No. 09251758.0, mailed Aug. 21, 2012, 6 pages.
Office Action Received in Chinese Patent Application No. 2 910152137,8, mailed on Apr. 25, 2012, 7 pages of Office Action, including 4 pages of English Translation.

* cited by examiner

RATE-DISTORTION COST REDUCING VIDEO ENCODING TECHNIQUES

FIELD

The subject matter disclosed herein relates to generally to video encoders and decoders.

RELATED ART

A video encoder compresses video information so that more information can be sent over a given bandwidth. The compressed signal may then be transmitted to a receiver that decodes or decompresses the signal prior to display.

Conventional video encoding algorithms result in losses. That is, in the course of compressing the video information, some information may be lost, resulting in decreased picture quality. Ideally, the video quality is improved to the greatest possible extent and the compression is increased to the greatest possible extent. However, these two goals tend to conflict with one another.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Figure 1:
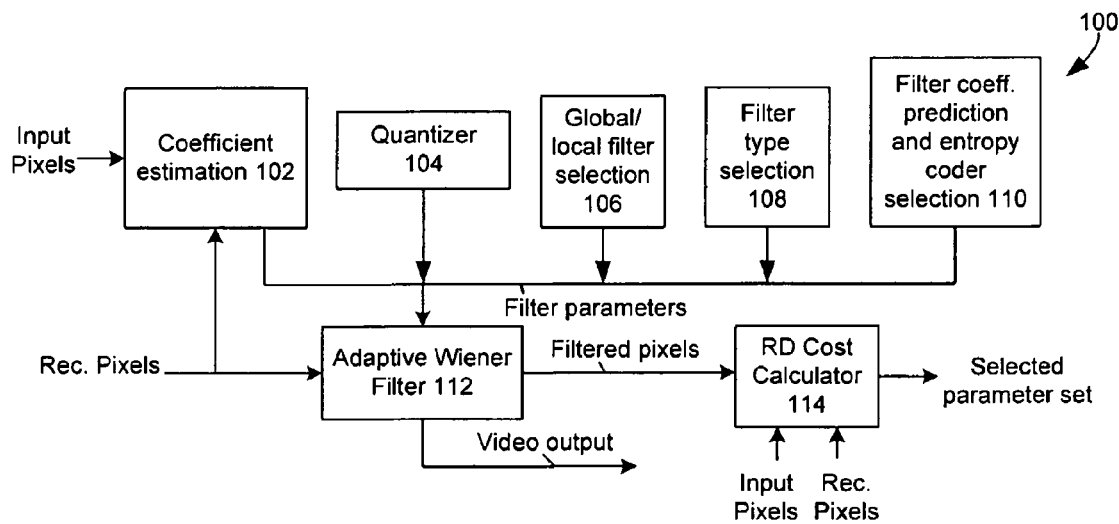
FIG. 1 depicts an example encoder system in accordance with some embodiments of the present invention.

FIG. 1 depicts an encoder system 100, in accordance with an embodiment of the present invention. Encoder system 100 includes coefficient estimation logic 102, quantizer 104, global/local filter selection 106, filter type selection logic 108, filter coefficient prediction and entropy coder selection logic 110, adaptive wiener filter 112, and RD cost calculator 114. In one embodiment, input pixels and reconstructed pixels ("rec. pixels") from a video region may be provided to encoder system 100 from a video encoder described in U.S. patent application entitled "IN-LOOP ADAPTIVE WIENER FILTER FOR VIDEO CODING AND DECODING," inventors Chiu and Xu, Ser. No. 12/082,182, filed Apr. 9, 2008 and "ADAPTIVE FILTERING FOR BIT-DEPTH SCALABLE VIDEO CODEC," inventors Chiu and Xu, Ser. No. 12/082, 561, filed Apr. 11, 2008 (collectively, hereafter "References"). More particularly, a video encoder loop such as that described with regard to FIG. 1 of U.S. patent application entitled "IN-LOOP ADAPTIVE WIENER FILTER FOR VIDEO CODING AND DECODING," inventors Chiu and Xu, Ser. No. 12/082,182, filed Apr. 9, 2008, may provide input pixels and reconstructed pixels.

Adaptive Wiener filter 112 may encode a video region according to parameters selected by each of coefficient estimation logic 102, quantizer 104, global/local filter selection logic 106, filter type selection logic 108, and filter coefficient prediction and entropy coder selection logic 110. RD cost calculator 114 may determine the Rate-Distortion (RD) cost for applying adaptive Wiener filtering to the video region using the selected parameters. Moreover, RD cost calculator 114 determines the RD cost for when no adaptive Wiener filtering is applied. If RD cost calculator 114 determines that the lowest RD cost is associated with not using adaptive Wiener filtering, then the video region is transferred without applying adaptive Wiener filtering by encoder 100. If RD cost calculator 114 determines that the lowest RD cost is associated with use of adaptive Wiener filtering, then the parameters associated with the lowest RD cost are transferred with the video encoded according to such parameters to a storage device or transmission media for decoding. The video region can be at a sequence level, group of picture (GOP) level, picture level, slice level, macroblock level, block level, or arbitrary picture regions.

Coefficient estimation logic 102 may determine filter coefficients that adaptive Wiener filter 112 is to apply. One manner in which coefficient estimation logic 102 determines coefficients is described in the References. Coefficient estimation logic 102 may determine coefficients based on pixel intensities in a video region. Coefficient estimation logic 102 may determine a coefficient matrix that can be M by N in dimension. For example, the coefficient matrix size can be 3×3, 5×5, 7×7, or 9×9, or other sizes, but does not need to be symmetrical. Coefficient estimation logic outputs its floating point coefficients matrix to quantizer 104.

Quantizer 104 may determine fixed point coefficients by quantizing the floating point filter coefficients determined by coefficient estimation logic 102. Various quantization steps can be used, such as a step of 8 bits, 10 bits, 12 bits, or other step values. Using a high quantization step can reduce the distortion, but may produce more bits and increase the bit rate used to transmit filter coefficients.

Global/local filter selection logic 106 may select filtering of a picture and/or a region of a picture using one or more of a global filter table and one or more local filter table. Global/local filter selection logic 106 may use quantized coefficients from quantizer 104. A global filter table may be produced from pixels from a picture. A local filter table may be produced from one or more pixels from a region of a picture. Using more local filter tables can reduce the distortion, but may increase the number of bits used for transmitting filter coefficients.

Filter type selection logic 108 may select at least one of various Wiener filter types to apply, such as 2-D non-separable filter, 1-D separable filter, and/or symmetric filter.

Filter coefficient prediction and entropy coder selection logic 110 may select one of various prediction and encoding modes to apply to the quantized coefficients, selected filter table, and filter type. Filter coefficients generally have spatial and temporal correlations. For filter coefficient prediction, filter coefficient prediction and entropy coder 110 may use at least one of spatial coefficient prediction, temporal coefficient prediction, spatial-temporal coefficient prediction, and direct mode (no coefficient prediction) to reduce the bitrate caused by transmitting filter coefficients.

For entropy coding, filter coefficient prediction and entropy coder selection logic 110 may select one of Exp-Golomb code, fixed length code, and size-value code. Other and/or additional entropy coding modes can be applied. Determining a fixed length code may involve finding the Wiener filter coefficient with the largest absolute value (C), then using Ceil(log 2(C+1))+1 bits to encode all coefficients, encoding the number of Ceil(log 2(C+1))+1 using Exp-Golomb code, and then transmitting the codes to a decoder. Function Ceil may involve rounding to an upper integer.

Determining a size-value code may involve the following. The following may be used to encode the size of a coefficient (i.e., number of bits in the coefficient): for each coefficient having an absolute value (C), coding its size to equal Ceil(log 2(C+1)) and using Exp-Golomb code. To encode a value of a size-value code, fixed-length coding is used. If the coefficient value is negative, then the coded value is (1<<Ceil(log 2(C+1)))−C). If the coefficient value is not negative, then the coded value is the value of the coefficient.

Each of coefficient estimation logic 102, quantizer 104, global/local filter selection 106, filter type selection 108, and filter coefficient prediction and entropy coder 110 may provide the selected parameters for a particular encoding of a video region to adaptive Wiener filter 112 and RD cost calculator 114.

Adaptive Wiener filter 112 may apply adaptive filtering on reconstructed pixels and output filtered pixels based on the parameters selected by logic 102-110. A Wiener filter is a filter that may achieve the least mean square error among the source signal and the reconstructed signal modeled through the random noise. In one embodiment, adaptive Wiener filter 112 may filter reconstructed pixels by applying equation (1) below. One embodiment of adaptive Wiener filter 112 is described in the References. Adaptive Wiener filter 112 outputs filtered pixels, $P'_{x,y}$, to RD cost calculator 114.

$$P'_{x,y} = \sum_{j=0}^{M-1} \sum_{i=0}^{N-1} P_{x',y'} C_{i,j} \quad (1)$$

where,
$P_{x,y}$ represents the reconstructed pixels (e.g., the deblocked pixels from the core encoding loop) and
$C_{i,j}$ represents quantized coefficients from quantizer 104 obtained by minimizing the distortion between $Q_{x,y}$ and $P'_{x,y}$, where $Q_{x,y}$ represents the input pixels to encoder 100.

Adaptive Wiener filter 112 may reduce the distortion between $P_{x,y}$ and $Q_{x,y}$ in a manner described in the References. Adaptive filter 112 outputs encoded video using each parameter set for storage into memory or for transmission.

RD cost calculator 114 may determine the RD cost for every parameter permutation applied by adaptive Wiener filter 112 and may select the parameters that result in the lowest RD cost. For each parameter permutation, RD cost calculator 114 may determine the RD cost for each permutation from equation (2):

$$J(\text{Pass}) = D(\text{Pass}) + \lambda R(\text{Pass}) \quad (2)$$

where,
R(Pass) is the bit rate of filter coefficients,
D is a SSD is the Sum of Squared Difference, and
λ is a Lagrangian factor for pass decision.

For example, let Pass1 not use adaptive Wiener filter 112 and Pass2 use adaptive Wiener filter 112. Then, the following are the D and R representations:

$$D(\text{Pass1}) = SSD(P_{x,y}, Q_{x,y}) R(\text{Pass1}) = 0$$

$$D(\text{Pass2}) = SSD(P'_{x,y}, Q_{x,y}) R(\text{Pass2}) = \text{Bits}(C_{i,j})$$

RD cost calculator 114 determines whether use of adaptive Wiener filter 112 results in the lowest RD cost. If use of adaptive Wiener filter 112 does not result in the lowest RD cost, then the video region is transferred without encoding by adaptive Wiener filter 112. If use of adaptive Wiener filter 112 results in the lowest RD cost, then RD cost calculator transfers the parameters applied by adaptive Wiener filter 112 that result in the lowest RD cost with the video region encoded according to such parameters. RD cost calculator 114 may encode the selected parameter set into a bit stream and transmit the bit stream to a storage or decoder.

The encoder of FIG. 1 may be consistent with the H.264 (advanced video codec (AVC) and MPEG-4 Part 10), compression standard, for example. The H.264 standard has been prepared by the Joint Video Team (JVT), which includes ITU-T SG16 Q.6, also known as VCEG (Video Coding Expert Group), and of the ISO-IEC JTC1/SC29/WG11 (2003), known as MPEG (Motion Picture Expert Group). H.264 is designed for applications in the area of digital TV broadcast, direct broadcast satellite video, digital subscriber line video, interactive storage media, multimedia messaging, digital terrestrial TV broadcast, and remote video surveillance, to mention a few examples.

While one embodiment may be consistent with H.264 video coding, the present invention is not so limited. Instead, embodiments may be used in a variety of video compression systems including MPEG-2 (ISO/IEC 13818-1 (2000) MPEG-2 available from International Organization for Standardization, Geneva, Switzerland) and VC1 (SMPTE 421M (2006) available from SMPTE White Plains, N.Y. 10601).

Figure 2:
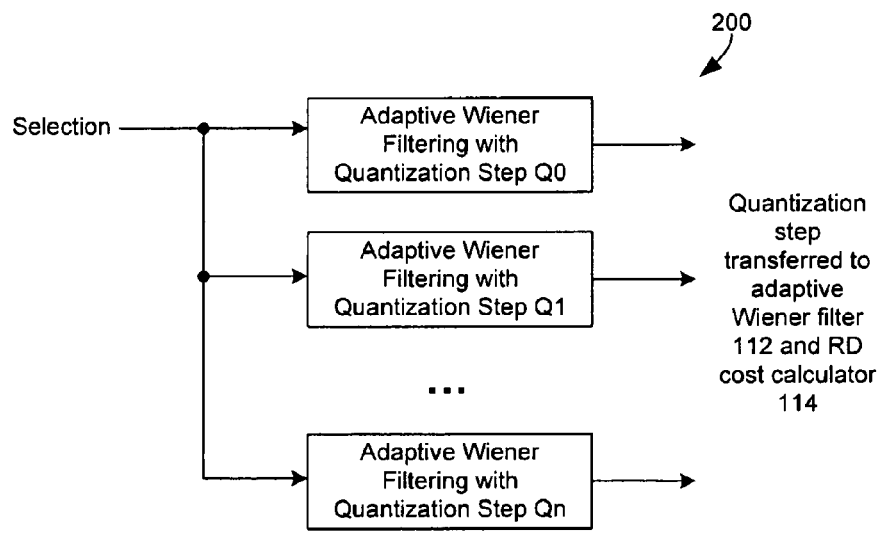
FIG. 2 depicts an example embodiment of a quantizer, in accordance with an embodiment of the present invention.

FIG. 2 depicts an example embodiment of a quantizer 200, in accordance with an embodiment of the present invention, that can select a quantization step parameter. For example, quantizer 200 may select any quantization step among Q0, Q1, to Qn for application to coefficients from coefficient estimation logic 102. Quantizer 200 may communicate the quantization step parameter to adaptive Wiener filter 112 and RD cost calculator 114.

Figure 3:
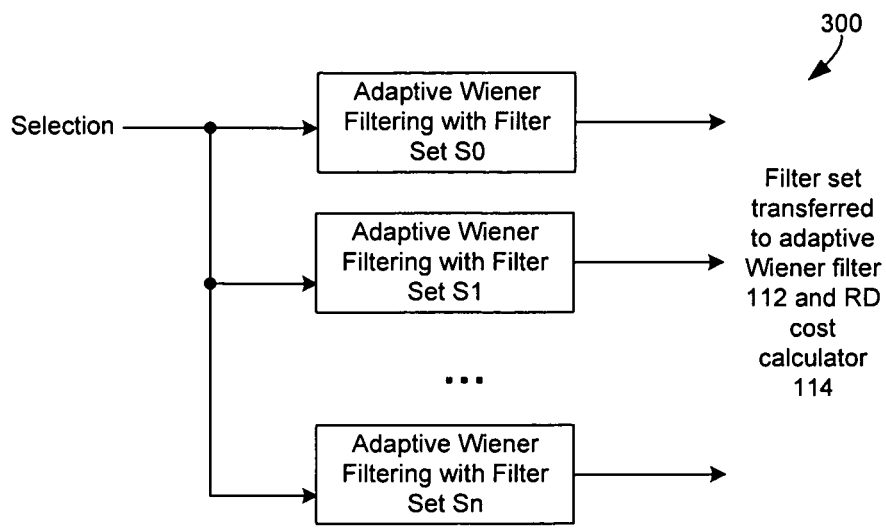
FIG. 3 depicts an example embodiment of a filter set selection logic, in accordance with an embodiment of the present invention.

FIG. 3 depicts an example embodiment of a filter set selection logic 300, in accordance with an embodiment of the present invention. For example, filter set selection logic 300 may select any filter table set among S0 to Sn. A filter table set can be selected from among global and local filter tables. Filter set selection logic 300 may communicate the filter table set parameter to adaptive Wiener filter 112 and RD cost calculator 114.

Figure 4:
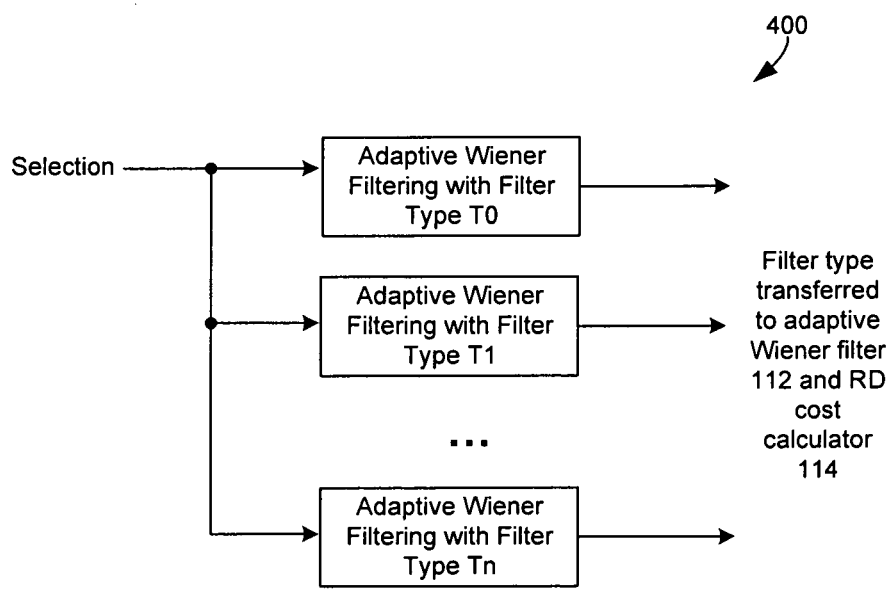
FIG. 4 depicts an example embodiment of a filter type selection logic, in accordance with an embodiment of the present invention.

FIG. 4 depicts an example embodiment of a filter type selection logic 400, in accordance with an embodiment of the present invention. For example, filter type selection logic 400 may select any filter type among T0 to Tn. A filter type can be selected from among at least a 2-D non-separable filter, 1-D separable filter, non-symmetric filter, and/or symmetric filter. Filter type selection logic 400 may communicate the filter type parameter to adaptive Wiener filter 112 and RD cost calculator 114.

Figure 5:
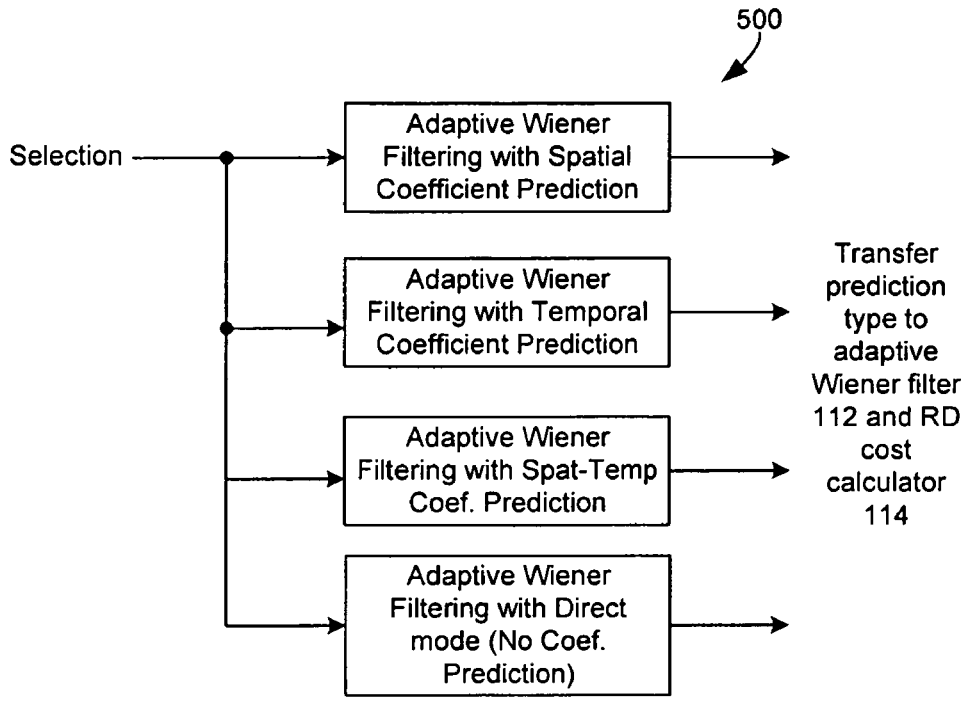
FIG. 5 depicts an example embodiment of a coefficient prediction mode selection logic, in accordance with an embodiment of the present invention.

FIG. 5 depicts an example embodiment of a coefficient prediction selection logic 500, in accordance with an embodiment of the present invention. Coefficient prediction logic 500 may select one of direct mode (no coefficient prediction), spatial coefficient prediction, temporal coefficient prediction, and spatial-temporal coefficient prediction. Coefficient prediction selection logic 500 may transfer the selected coefficient prediction mode to adaptive Wiener filter 112 and RD cost calculator 114.

Figure 6:
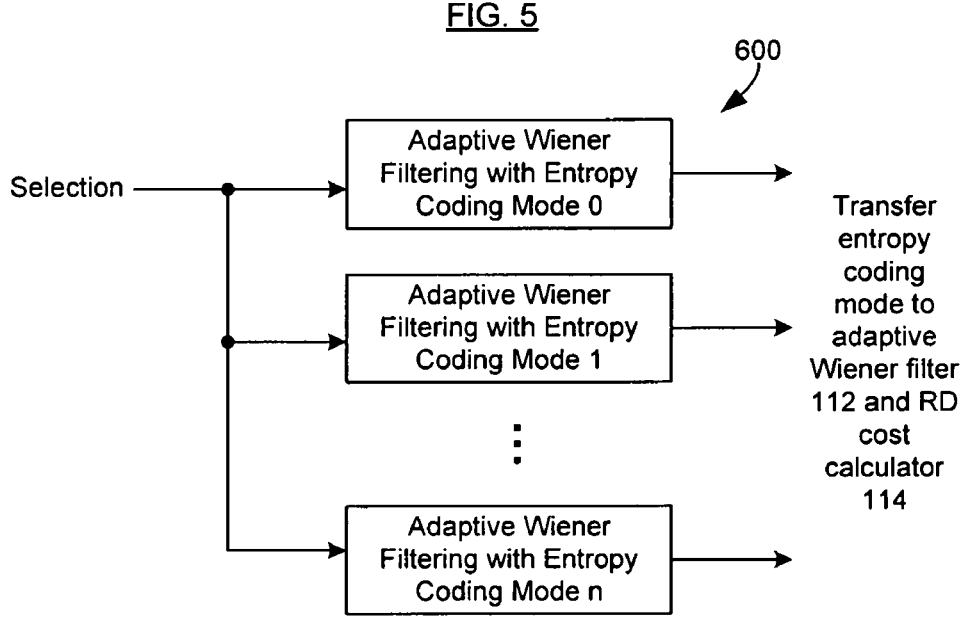
FIG. 6 depicts an entropy coder selection logic, in accordance with an embodiment of the present invention.

FIG. 6 depicts an entropy coder 600, in accordance with an embodiment of the present invention. Entropy coder 600 may select one of Exp-Golomb code, fixed length code, and size-value code to apply to the selected filter type, filter set, and quantized coefficients. Entropy coder 600 may transfer the selected entropy coding mode to adaptive Wiener filter 112 and RD cost calculator 114.

Figure 7:
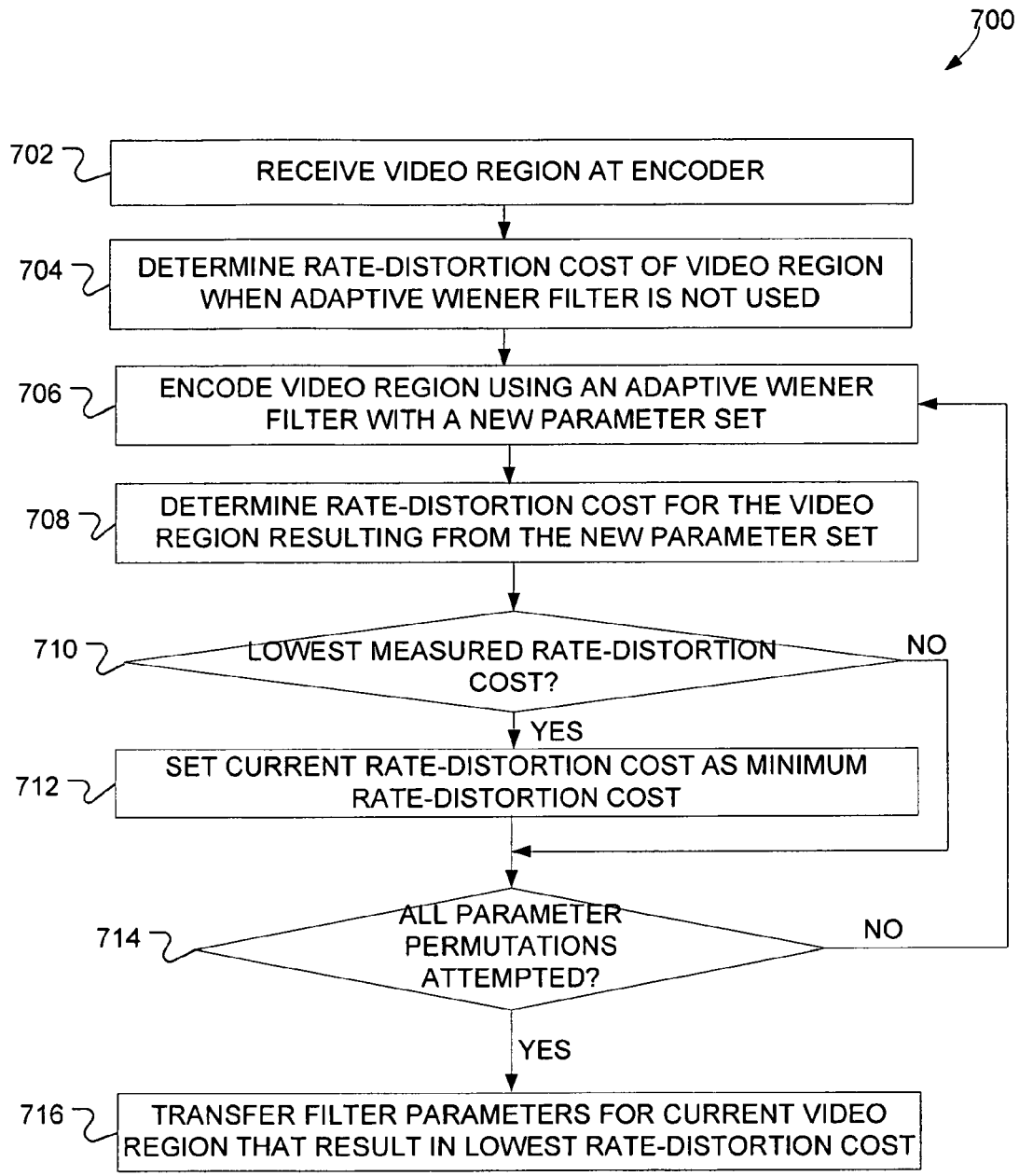
FIG. 7 depicts an example flow diagram that can be used to determine filter parameters that result in a desirable rate distortion cost, in accordance with an embodiment of the present invention.

FIG. 7 depicts an example flow diagram that can be used to determine encoder parameters that result in a desirable rate distortion cost, in accordance with an embodiment of the present invention. Block 702 may include receiving a video region at an encoder. A video region may include one or more pictures, slices, macroblocks, blocks or pixels.

Block 704 may include determining the rate-distortion cost of the video region when an adaptive Wiener filter is not used. Rate-distortion cost can be measured using equation (1).

Block 706 may include encoding the video region using adaptive Wiener filtering with a new parameter set. Adaptive filtering may include filtering that is content dependent or based on an analysis of pixel intensities in a portion of a picture, a picture as a whole, or a plurality of successive pictures. For example, the type of video information that is received, be it graphics or stream view video, results in different taps in the Wiener filter for different types of video. Thus, adaptive filter taps are the result of an examination of the intensity of each pixel in a given picture portion, picture, or series of pictures. Parameters can be selected from among various coefficients, quantization levels, filter size, filter types, coefficient prediction, and entropy coding. For example, the parameters can be selected in a manner similar to that described with regard to elements 102-110 of encoder 100.

Block 708 may include determining the rate-distortion cost for the video region resulting from adaptive Wiener filtering using the new parameter set.

Block 710 may include determining whether the rate-distortion cost for the current encoder parameter set is the lowest measured rate-distortion cost. If the rate-distortion cost is the lowest, then block 712 follows block 710. If the rate-distortion cost is not the lowest, then block 714 follows block 710.

Block 712 may include setting the rate-distortion cost for the current rate-distortion cost as the lowest measured rate-distortion cost. Block 712 may also include identifying the encoder parameter set associated with the lowest measured rate-distortion cost.

Block 714 may include determining whether all parameter sets have been applied by the adaptive Wiener filter. If all parameter sets have been applied by the adaptive Wiener filter, then block 716 may follow block 714. If all parameter sets have not been applied by the encoder, then block 706 may follow block 714.

Block 716 may include transferring the filter parameter set for the current video region that results in the lowest rate-distortion cost. The filter parameters can be transferred with the video region processed using the filter parameter set that result in lowest rate-distortion cost. For example, a frame buffer may store the current video region encoded with every filter parameter set. The frame buffer may transfer the video region encoded with the filter parameter set corresponding to the lowest measured video region encoded with every encoder parameter set.

However, if the rate distortion cost associated with not using adaptive Wiener filtering is the lowest rate distortion cost, then adaptive Wiener filtering is not applied to the video region and no filter parameters are transferred with the video region.

Figure 8:
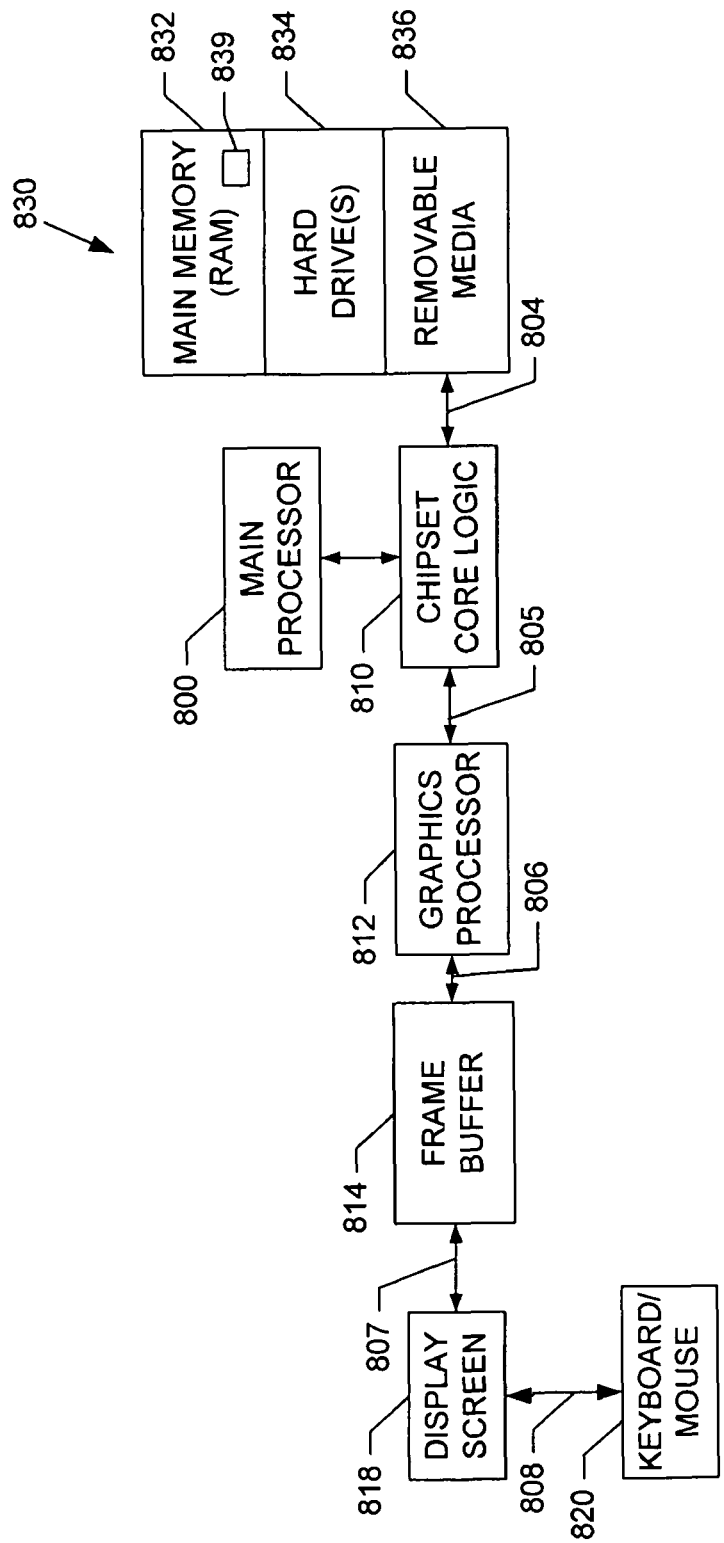
FIG. 8 depicts a system, in accordance with an embodiment of the present invention.

Referring to FIG. 8, the encoder and logic depicted in FIGS. 1-6 may, in one embodiment, be part of a graphics processor 812. Embodiments of the present invention may be implemented as any or a combination of: one or more microchips or integrated circuits interconnected using a motherboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

In the case of a software implementation, the pertinent code may be stored in any suitable semiconductor, magnetic or optical memory, including the main memory 832. Thus, in one embodiment, source code 839 may be stored in a machine readable medium, such as main memory 832, for execution by a processor, such as the processor 800 or the graphics processor 812.

A computer system 830 may include a hard drive 834 and a removable medium 836, coupled by a bus 804 to a chipset core logic 810. The core logic may couple to the graphics processor 812 (via bus 805) and the main processor 800 in one embodiment. The graphics processor 812 may also be coupled by a bus 806 to a frame buffer 814. The frame buffer 814 may be coupled by a bus 807 to a display screen 818, in turn coupled to conventional components by a bus 808, such as a keyboard or mouse 820.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multicore processor. In a further embodiment, the functions may be implemented in a consumer electronics device.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method comprising:
    encoding a video region using first parameters, the encoding using first parameters including applying adaptive Wiener filtering to the video region using the first parameters;
    encoding the video region using second parameters, the encoding using second parameters including applying adaptive Wiener filtering to the video region using the second parameters;
    setting a lowest rate-distortion cost of the video region as the lowest among: a rate-distortion cost resulting from adaptive Wiener filtering of the video region using the first parameters, a rate-distortion cost resulting from adaptive Wiener filtering of the video region using the second parameters, and a rate-distortion cost resulting from not applying adaptive Wiener filtering to the video region;
    selecting parameters from among the first and second parameters associated with a lowest rate-distortion cost in response to the lowest rate-distortion cost resulting from adaptive Wiener filtering of the video region using the first or the second parameters;
    selectively transferring selected parameters for the video region in response to the lowest-rate distortion cost resulting from adaptive Wiener filtering using first or second parameters, wherein transferred selected parameters are for use to modify and replace at least one pixel; and
    selectively transferring no filter parameters associated with the video region in response to the lowest rate-distortion cost resulting from not applying adaptive Wiener filtering to the video region.

2. The method of claim 1, wherein the encoding using first parameters and encoding using second parameters include use of coefficients in at least two filter sizes, the filter sizes having dimensions m by n, where m and n are positive integers.

3. The method of claim 1, wherein the encoding using first parameters and encoding using second parameters include use of a quantization step selected from among multiple quantization steps.

4. The method of claim 1, wherein the encoding using first parameters and encoding using second parameters include use of at least one filter table selected from among global and local filter sizes.

5. The method of claim 1, wherein the encoding using first parameters and encoding using second parameters include use of one of a 2-D non-separable filter, 1-D separable filter, non-symmetric filter, and symmetrical filter.

6. The method of claim 1, wherein the encoding using first parameters and encoding using second parameters include use of a prediction mode selected from a group consisting of: no prediction, temporal prediction, spatial prediction, and temporal-spatial combined prediction.

7. The method of claim 1, wherein the encoding using first parameters and encoding using second parameters include use of an entropy coding mode, wherein the entropy coding mode is selected from a group consisting of: Exp-Golomb coding mode, fixed length coding mode, and size-value coding mode.

8. The method of claim 1, further comprising:
    storing the video regions encoded according to the first and second parameters; and
    transferring the selected parameters with the video region encoded according to the selected parameters.

9. The method of claim 1, wherein the video region is selected from a group consisting of: sequence level, group-of-pictures, picture, slice level, one or more macroblocks, block level, and pixels.

10. The method of claim 1, wherein the video region comprises a collection of pixels with similar features, the features comprising pixel value and gradient.

11. An apparatus comprising:
    one or more adaptive Wiener filters to receive a video region and to filter the video region using parameters selected from among at least a first and second parameters; and
    a rate-distortion cost calculator to determine a rate-distortion cost associated with no use of the adaptive Wiener filter for the video region and rate-distortion costs associated with the video region filtered by the adaptive Wiener filter according to the first and second parameters,
    wherein the rate-distortion cost calculator is to set a lowest rate-distortion cost of the video region as a lowest rate-distortion cost associated with no use of the adaptive Wiener filter for the video region or one of the rate-distortion costs associated with the video region filtered by the adaptive Wiener filter using the first and second parameters and
    wherein if the lowest rate-distortion cost is the one of the rate-distortion costs for one of the first and second parameters, the rate-distortion cost calculator is to provide the parameters associated with the lowest rate-distortion cost and if the lowest rate-distortion cost is the rate-distortion cost associated with no use of the adaptive Wiener filter of the video region, the rate-distortion cost calculator is to provide no parameters for filtering the video region, wherein the provided parameters are for use by a filter to modify and replace at least one pixel.

12. The method of claim 1, further comprising selectively providing the video region with no applied filtering in response to a lowest rate-distortion cost associated with not using adaptive filtering on the region.

13. The apparatus of claim 11, wherein the parameters comprise coefficients and further comprising a coefficient determiner to determine the coefficients.

14. The apparatus of claim 11, wherein the parameters comprise a quantization level and further comprising a quantizer to select the quantization level.

15. The apparatus of claim 11, wherein the parameters comprise a global or local region and further comprising a filter selection logic to select a region in which to apply filter coefficients.

16. The apparatus of claim 11, wherein the parameters comprise a filter type selected from a group consisting of a 2-D non-separable filter, 1-D separable filter, non-symmetric filter, and symmetrical filter and further comprising filter type selection logic to select a filter type to apply.

17. The apparatus of claim 11, wherein the parameters comprise an encoding type selected from a group consisting of: no prediction, temporal prediction, spatial prediction, and temporal-spatial combined prediction and further comprising filter coefficient prediction logic to select an encoding type.

18. The apparatus of claim 11, wherein the parameters comprise an entropy coding mode selected from a group consisting of Exp-Golomb coding mode, fixed length coding mode, and size-value coding mode and further comprising entropy encoder logic to select an entropy coding mode to apply.

19. The apparatus of claim 11, wherein the video region is selected from a group consisting of: sequence level, group-of-pictures, picture, slice level, one or more macroblocks, block level, and pixels.

20. A system comprising:
a processor;
a graphics sub-system communicatively coupled to the processor, the graphics sub-system comprising:
one or more adaptive Wiener filters to filter a video region using parameters selected from among at least first and second parameters, and
a rate-distortion cost calculator to determine a rate-distortion cost associated with no use of the adaptive Wiener filter for the video region and rate-distortion costs associated with the video region filtered by the adaptive Wiener filter according to the first and second parameters,
wherein the rate-distortion cost calculator is to choose a lowest rate-distortion cost of the video region from among the rate-distortion cost associated with no use of the adaptive Wiener filter for the video region and the rate-distortion costs associated with the video region filtered by the adaptive Wiener filter according to the first and second parametersets;
wherein if the lowest rate-distortion cost is the one of the rate-distortion costs for one of the first and second parameters, the rate-distortion cost calculator is to provide the parameters associated with the lowest rate-distortion cost and if the lowest rate-distortion cost is the rate-distortion cost associated with no use of the adaptive Wiener filter of the video region, the rate-distortion cost calculator is to provide no parameters for filtering the video region, wherein the provided parameters are for use by a filter to filter and replace at least one pixel;
a memory device communicatively coupled to the graphics sub-system; and
a display communicatively coupled to the graphics sub-system.

21. The system of claim 20, wherein the memory device is to store the video region associated with the lowest rate-distortion cost.

22. The system of claim 20, wherein first parameters and second parameters include parameters selected from a group consisting of: filter coefficients, quantization levels, filter sizes, filter types, coefficient prediction modes, and entropy coding modes with which adaptive Wiener filtering is applied to the video region.

23. The system of claim 20, wherein first parameters and second parameters include coefficients in at least two filter sizes, the filter sizes having dimensions m by n, where m and n are positive integers.

24. The system of claim 20, wherein first parameters and second parameters include use of at least one filter table selected from among global and local filter sizes.

25. The system of claim 20, wherein first parameters and second parameters include use of one of a 2-D non-separable filter, 1-D separable filter, non-symmetric filter, and symmetrical filter.

26. The system of claim 20, wherein first parameters and second parameters include a prediction mode selected from a group consisting of: no prediction, temporal prediction, spatial prediction, and temporal-spatial combined prediction.

27. The system of claim 20, wherein first parameters and second parameters include an entropy coding mode, wherein the entropy coding mode is selected from a group consisting of: Exp-Golomb coding mode, fixed length coding mode, and size-value coding mode.

* * * * *